(12) United States Patent
Stremel et al.

(10) Patent No.: US 9,026,605 B2
(45) Date of Patent: *May 5, 2015

(54) DIGITAL FILE DISTRIBUTION IN A SOCIAL NETWORK SYSTEM

(71) Applicant: Facebook, Inc., Menlo Park, CA (US)

(72) Inventors: Jed Stremel, Burlingame, CA (US); Thyagarajapuram S. Ramakrishnan, Saratoga, CA (US); Mark Slee, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,186

(22) Filed: Dec. 4, 2013

(65) Prior Publication Data

US 2014/0095621 A1 Apr. 3, 2014

Related U.S. Application Data

(63) Continuation of application No. 13/475,673, filed on May 18, 2012, now Pat. No. 8,655,976, which is a continuation of application No. 11/701,698, filed on Feb. 2, 2007, now Pat. No. 8,204,952.

(51) Int. Cl.
*H04L 29/06* (2006.01)
*G06F 17/30* (2006.01)
(Continued)

(52) U.S. Cl.
CPC .... *G06F 17/30545* (2013.01); *G06F 17/30867* (2013.01); *G06Q 50/01* (2013.01);
(Continued)

(58) Field of Classification Search
CPC .. G06F 17/30867; G06Q 50/01; H04L 29/06; H04L 67/06; H04L 63/101; H04L 67/1063; H04L 67/12; H04L 65/403; H06F 17/30545
USPC ......................................... 709/213, 214–216
See application file for complete search history.

(56) References Cited

U.S. PATENT DOCUMENTS 5,937,413 A  8/1999  Hyun et al.
6,029,141 A  2/2000  Bezos et al.
(Continued)

FOREIGN PATENT DOCUMENTS

WO  WO 2006/026056 A1  3/2006

OTHER PUBLICATIONS

ChipIn, "How ChipIn Works: An Overview," Dec. 15, 2006, three pages. [Online] [Retrieved Jun. 20, 2008] Retrieved from the Internet <URL:http://web.archive.org/web/20061215090739/www.chipin.com/overview.>.

(Continued)

*Primary Examiner* — Thai Nguyen
(74) *Attorney, Agent, or Firm* — Fenwick & West LLP

(57) ABSTRACT

Systems and methods for obtaining a digital file similar to one used by a device associated with a member of a social network are provided. Digital file information about the digital file is stored on a web-based social network database. The digital file may be located on the same server as the web-based social network database or a third party server such as a mobile phone carrier. A user of the web-based social network database requesting the digital file may require a different format of the digital file than that used by the device of the member. If a different format is requested by the user, a server finds or converts the digital file to be compatible for use by a device specified by the user.

19 Claims, 7 Drawing Sheets

(51) Int. Cl.
*G06Q 50/00* (2012.01)
*H04L 29/08* (2006.01)

(52) U.S. Cl.
CPC .............. *H04L 29/06* (2013.01); *H04L 67/104* (2013.01); *H04L 67/06* (2013.01); *H04L 67/30* (2013.01); *H04L 67/1063* (2013.01); *H04L 67/12* (2013.01); *H04L 63/101* (2013.01); *H04L 65/403* (2013.01)

(56) References Cited

U.S. PATENT DOCUMENTS

| | | | |
|---|---|---|---|
| 7,013,292 | B1 | 3/2006 | Hsu et al. |
| 7,249,123 | B2 | 7/2007 | Elder et al. |
| 7,269,590 | B2 | 9/2007 | Hull et al. |
| 2001/0037721 | A1 | 11/2001 | Hasegawa et al. |
| 2002/0059201 | A1 | 5/2002 | Work |
| 2002/0124053 | A1 | 9/2002 | Adams et al. |
| 2003/0145093 | A1 | 7/2003 | Oren et al. |
| 2003/0222918 | A1 | 12/2003 | Coulthard |
| 2003/0225632 | A1 | 12/2003 | Tong et al. |
| 2004/0024846 | A1 | 2/2004 | Randall et al. |
| 2004/0088177 | A1 | 5/2004 | Travis et al. |
| 2004/0148275 | A1 | 7/2004 | Achlioptas |
| 2005/0021750 | A1 | 1/2005 | Abrams |
| 2005/0114759 | A1 | 5/2005 | Williams et al. |
| 2005/0154639 | A1 | 7/2005 | Zetmeir |
| 2005/0159970 | A1 | 7/2005 | Buyukkokten et al. |
| 2005/0171799 | A1 | 8/2005 | Hull et al. |
| 2005/0171955 | A1 | 8/2005 | Hull et al. |
| 2005/0177385 | A1 | 8/2005 | Hull et al. |
| 2005/0197846 | A1 | 9/2005 | Pezaris et al. |
| 2005/0198020 | A1 | 9/2005 | Garland et al. |
| 2005/0198031 | A1 | 9/2005 | Pezaris et al. |
| 2005/0198305 | A1 | 9/2005 | Pezaris et al. |
| 2005/0203807 | A1 | 9/2005 | Bezos et al. |
| 2005/0216300 | A1 | 9/2005 | Appelman et al. |
| 2005/0216550 | A1 | 9/2005 | Paseman et al. |
| 2005/0235062 | A1 | 10/2005 | Lunt et al. |
| 2005/0256756 | A1 | 11/2005 | Lam et al. |
| 2006/0041543 | A1 | 2/2006 | Achlioptas |
| 2006/0042483 | A1 | 3/2006 | Work et al. |
| 2006/0048059 | A1 | 3/2006 | Etkin |
| 2006/0052091 | A1 | 3/2006 | Onyon et al. |
| 2006/0080613 | A1 | 4/2006 | Savant |
| 2006/0085419 | A1 | 4/2006 | Rosen |
| 2006/0136419 | A1 | 6/2006 | Brydon et al. |
| 2006/0143183 | A1 | 6/2006 | Goldberg et al. |
| 2006/0149681 | A1 * | 7/2006 | Meisner .......................... 705/52 |
| 2006/0161599 | A1 | 7/2006 | Rosen |
| 2006/0184617 | A1 | 8/2006 | Nicholas et al. |
| 2006/0190281 | A1 | 8/2006 | Kott et al. |
| 2006/0194186 | A1 | 8/2006 | Nanda |
| 2006/0218225 | A1 | 9/2006 | Hee Voon et al. |
| 2006/0218226 | A1 * | 9/2006 | Johnson et al. ............... 709/202 |
| 2006/0229063 | A1 | 10/2006 | Koch |
| 2006/0230061 | A1 | 10/2006 | Sample et al. |
| 2006/0247940 | A1 | 11/2006 | Zhu et al. |
| 2006/0248573 | A1 | 11/2006 | Pannu et al. |
| 2006/0256008 | A1 | 11/2006 | Rosenberg |
| 2006/0265227 | A1 | 11/2006 | Sadamura et al. |
| 2006/0293976 | A1 | 12/2006 | Nam |
| 2007/0078772 | A1 * | 4/2007 | Dadd .............................. 705/52 |
| 2007/0174389 | A1 | 7/2007 | Armstrong et al. |
| 2007/0208916 | A1 | 9/2007 | Tomita |
| 2007/0282987 | A1 | 12/2007 | Fischer et al. |
| 2008/0005076 | A1 | 1/2008 | Payne et al. |
| 2008/0010343 | A1 | 1/2008 | Escaffi et al. |
| 2008/0033776 | A1 | 2/2008 | Marchese |
| 2008/0040428 | A1 | 2/2008 | Wei et al. |
| 2008/0070697 | A1 | 3/2008 | Robinson et al. |
| 2008/0086458 | A1 | 4/2008 | Robinson et al. |

OTHER PUBLICATIONS

Flores, F. et al., "Computer Systems and the Design of Organizational Interaction," *ACM Transactions on Information Systems*, Apr. 1988, pp. 153-172, vol. 6, No. 2.

Parzek, E. "Social Networking to ChipIn to a Good Cause," Business Design Studio, Jun. 29, 2006. [Online] [Retrieved Jun. 20, 2008] Retrieved from the Internet <URL:http://www.businessdesignstudio.com/resources/blogger/2006.06social-networking-tochipin-to-good.html.>.

PCT International Search Report and Written Opinion, PCT Application No. PCT/US2007/02820, Feb. 13, 2008, four pages.

United States Office Action, U.S. Appl. No. 14/097,184, Apr. 11, 2014, twelve pages.

United States Office Action, U.S. Appl. No. 14/097,184, Jul. 9, 2014, twelve pages.

United States Office Action, U.S. Appl. No. 14/097,188, Aug. 7, 2014, twelve pages.

* cited by examiner

DIGITAL FILE DISTRIBUTION IN A SOCIAL NETWORK SYSTEM

CROSS-REFERENCE TO RELATED APPLICATIONS

This application is a continuation of U.S. patent application Ser. No. 13/475,673, filed on May 18, 2012, which is a continuation of U.S. patent application Ser. No. 11/701,698, filed on Feb. 2, 2007, which are incorporated by reference herein in their entirety.

BACKGROUND OF THE INVENTION

1. Field of the Invention

The present invention relates generally to digital contact files, and more particularly to systems and methods for digital file distribution in a social network.

2. Description of Related Art

Conventionally, members of a social network who desire a similar digital file, such as a ringtone, game, image file or any other file used by a device, as another member of the social network have limited methods to obtain the digital file. One method is for the owner of the digital file to make a copy and transfer it to the member who desires the copy. In some situations, however, the owner is not available to make the copy, does not have permission to make a copy or does not have a device that can make a copy. In these situations, the member who desires a copy may be required to seek the digital file from a third party. In some situations, this requires the member to search the Internet for the digital file or to request the digital file from a publisher of the digital file.

For some members who desire the digital file, a version of the digital file may not be available for their device. For example, if a ringtone has only been modified for use on a Verizon mobile phone, a member with a Nokia mobile phone may not be able to use that version of the digital file if the Verizon mobile phone and Nokia mobile phone have different ringtone formats. In this situation, the member with the Nokia mobile phone may need to request the ringtone from a Nokia wireless carrier.

Other members who desire a digital photo taken with a friend's camera may be able to have the friend send the digital photo, but may be unable to edit the digital photo so as to have the digital photo display proportionally on their device. What is needed are improved methods and systems for automatically locating or converting digital files compatible for use by devices.

SUMMARY OF THE INVENTION

Systems and methods are provided for distributing a digital file between users of a peer-to-peer network using a web-based social network database. An exemplary method according to one embodiment of the invention includes storing identification information of the digital file in a record of a first user of a web-based social network database, receiving a request from a second user of the web-based social network database for the digital file, locating a source of a similar digital file, and facilitating the transfer of the similar digital file from the source to the device.

An exemplary system according to one embodiment of the present invention includes a web-based social network database and a finder module. The web-based social network database stores identification information of the digital file in a record of a first user of the web-based social network database and receives a request from a second user for the digital file wherein the request is partially based on the identification information in the record of the first user. A finder module locates a source of a similar digital file and facilitates the transfer of the similar digital file from the source to a device.

The digital file may be a ringtone, game, image file or any other file used by a device. The digital file may be located on a server which also contains the web-based social network database or a different server, such as a third party server. The server may recommend additional digital files. The server may automatically detect the device being used to request the digital file or the user may provide information about the device. The server may locate the source of the digital file using the device information to ensure that the digital file is compatible with the device. The server may convert the digital file to a format to be used by the device.

DETAILED DESCRIPTION OF THE INVENTION

Systems and methods for distributing to a user's device a digital file listed in a record of another user of a web-based social network database are disclosed. The web-based social network database is any database that may be accessed over a network and may store peer-to-peer network information about a user in one or more records. Peer-to-peer network information may include information about people, relationships, contacts, social activities, groups, events, user devices and information about digital files on user devices.

The distribution of the digital file is requested by the user after obtaining information that another user has the digital file. The user may obtain the information about the digital file from the other user in person, for example, by hearing his ringtone, or by viewing the other user's record of the web-based social network database.

In various embodiments, the device is a computer or a mobile device, such as a mobile phone, a cell-phone, a smart-phone, a personal digital assistant (PDA), a notebook computer, a laptop computer or a hand-held game console. The digital file is any type of file that can be accessed by a computer or a mobile device, such as a ringtone, a game, a picture, an image, a movie, a video, an audiovisual, a pictorial or any other digital document, such as a resume, a calendar, a presentation, a slideshow, an album or an e-mail. The digital file may be in any format that can be read by a computer or mobile device, such as those saved using Microsoft (MS) Word, MS Excel, MS PowerPoint, MS Access or any format that can be read by a mobile device such as files formatted in JPEG, MPEG, PDF, Multimedia Messaging Service (MMS), Short Messaging Service (SMS) or WAP Push.

The digital file can also be a social map and/or a social timeline. A social map in one embodiment is a display of the interactions, relationships and experiences of individuals or groups of individuals comprising the web-based social network database, as described in U.S. Provisional Patent Application Ser. No. 60/750,844 filed on Dec. 14, 2005 for "Systems and Methods for Social Mapping," and incorporated herein by reference. A social timeline in one embodiment is a chronological listing of a user selected subset of individuals of the web-based social network database in social categories, as described in U.S. Provisional Patent Application Ser. No. 60/753,810 filed on Dec. 23, 2005 for "Systems and Methods for Social Timeline," and incorporated herein by reference.

Figure 1:
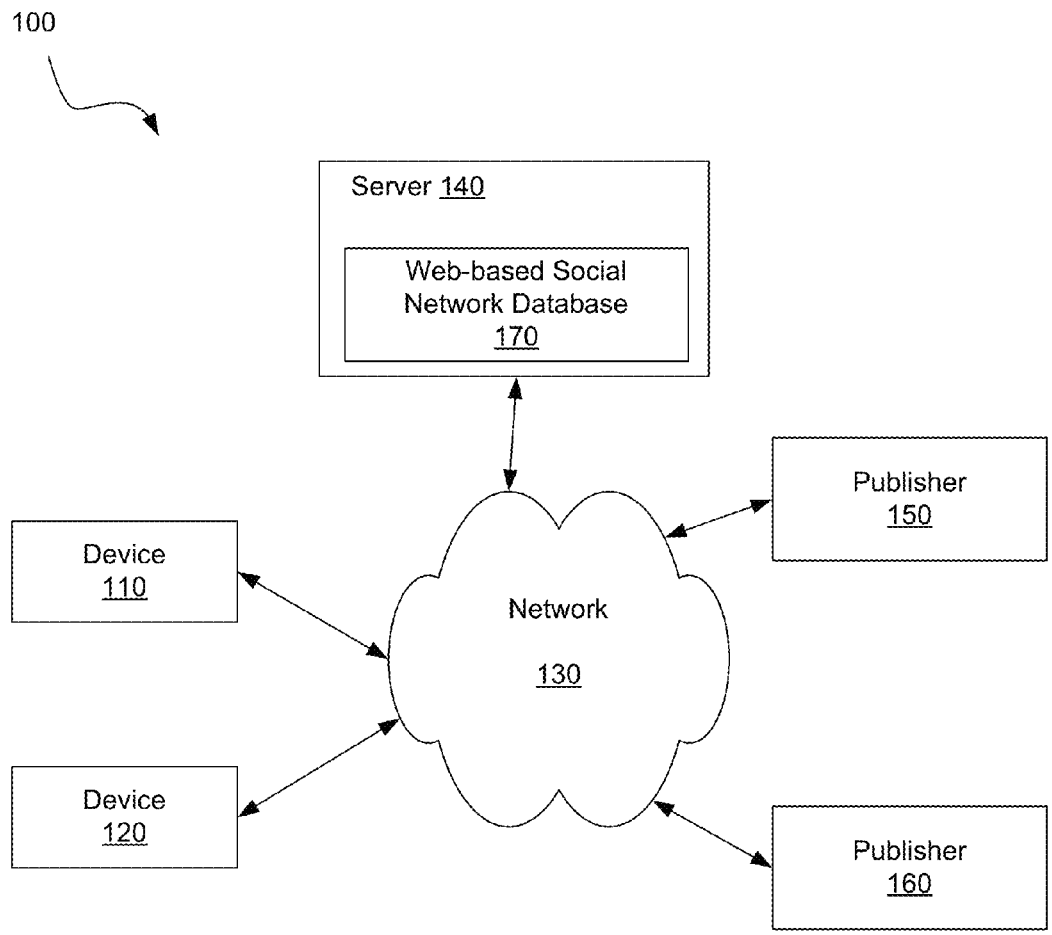
FIG. 1 illustrates an exemplary architecture for distribution of a digital file.

FIG. 1 illustrates an exemplary architecture 100 for distribution of a digital file. Architecture 100 comprises devices 110 and 120, a network 130, a server 140, and publishers 150 and 160. Server 140 comprises a web-based social network database 170. Devices 110 and 120 may be operated by a same user or by different users.

The network 130 provides the medium for communication between two or more components, such as between server 140 and device 110. Network 130 may include an Internet network and/or wireless or wired networks such as mobile device carrier networks or any other network that can be used for communication between a server and a client.

The server 140 allows a user of device 120 to obtain a similar digital file as on device 110 where information about the digital file is stored on the web-based social network database 170. The web-based social network database 170 stores information about a user and/or the user's device 110 in a record. For example, a user's record contains title and artist information about ringtones on the user's device 110. The ringtone information may include the title, musician, publisher, copyright, and any other information associated with a ringtone, such as format type, duration of ringtone, and device compatibility information.

The web-based social network database 170 is designed to stored information that may have been entered manually by the user or may have been obtained automatically by server 140 when device 110 is being used to communicate with the web-based social network database 170.

In some embodiments, a record contains information about several ringtones per device and an associated use for each ringtone, e.g., if the caller is known, unknown or is using caller ID blocking. In other embodiments, the record stores information on contacts stored in device 110 and any associated assigned ringtones, for example, the contact 'mom' may be associated with the ringtone based on Mozart, "Symphony 29," when she is calling from her home and Mozart, "Symphony 31," when she is calling from her mobile phone. In various embodiments, the device 110 ringtone information is automatically updated after any changes are made.

In some embodiments, a user of device 120 may learn of a digital file on device 110 and desire to have a similar digital file loaded onto device 120. The user of device 120 may ask the user of device 110 for identification information about the digital file or may view a record of the web-based social network database 170 to find information about the digital file. In various embodiments, the user of device 120 may request the digital file from server 140. Server 140 may have a version of the digital file compatible with device 120 or may know a source of a compatible digital file for use by device 120, such as publisher 160.

In various embodiments, after server 140 locates the digital file for device 120, server 140 facilitates the transfer of the digital file to a memory assessable by device 120. In some embodiments, server 140 may load the digital file directly onto device 120. In other embodiments, server 140 may have a publisher load the digital file onto device 120 or some other memory location assessable by device 120.

Figure 2:
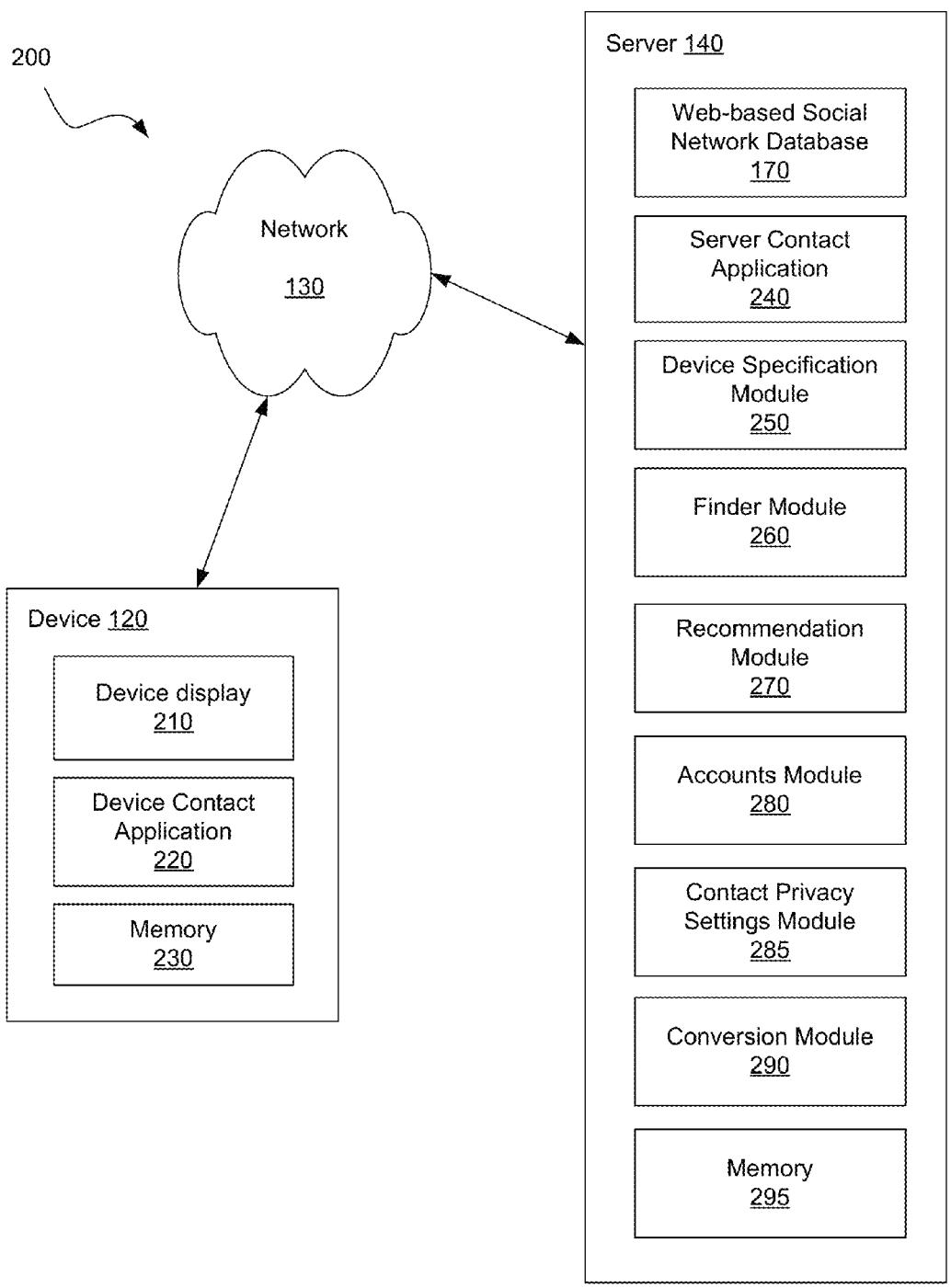
FIG. 2 illustrates an exemplary architecture for requesting a digital file.

FIG. 2 illustrates an exemplary architecture 200 for requesting a digital file. In various embodiments, architecture 200 includes device 120, network 130 and server 140. Device 120 may include device display 210, a device contact application 220 and memory 230. The device contact application 220 may contain a contact content request module (not shown) used for requesting contact information and a contact file (not shown) used for storing contact information. Server 140 contains a server contact application 240, a device specification module 250, a finder module 260, a recommendation module 270, an accounts module 280, a contact privacy settings module 285, a conversion module 290 and a memory 295. In various embodiments, server 140 may exclude some of these modules and/or add other modules, e.g., server 140 may contain the web-based social network database 170, finder module 260 and memory 295.

In various embodiments, server 140 uses server contact application 240 to communicate with device 120. After device 120 establishes communication with server 140 for the first time, device contact application 220 may be downloaded onto device 120 for use with identification and/or further communication. Device contact application 220 may format information from the web-based social network database 170 for device display 210. Device contact application 220 may also contain the contact information about other users with records on the web-based social network database 170. In various embodiments, device 120 uses memory 230 to store device contact application 220 and/or any information downloaded from the web-based social network database 170.

In some embodiments, server 140 uses device specification module 250 to determine specifications of device 120 used by the user requesting the digital file. Device specification module 250 may contain specifications for a wide variety of devices. After device specification module 250 recognizes the type of device 120 being used to communicate with server 140, device specification module 250 formats information to accommodate the specification particular for device 120. For example, device specification module 250 automatically recognizes that a user is using a BlackBerry device to communicate with server 140 and formats information to display on device display 210 of the BlackBerry device.

In various embodiments, server 140 includes finder module 260. After a user makes a request for a digital file, finder module 260 searches for a digital file similar to the requested digital file. As different devices may require different formats for different types of files, in some embodiments, finder module 260 determines an appropriate digital file that can be used by device 120 before searching for a digital file. Finder module 260 may obtain information about device 120 from the device specification module 250 and/or the web-based social network database 170. In various embodiments, finder module 260 searches for the digital file until the digital file is found in the web-based social network database 170 and/or third party publishers, such as publisher 150 and publisher 160, respectively.

In some embodiments, server 140 includes recommendation module 270. After a user makes a request for a digital file, recommendation module 270 searches for digital files related to the requested digital file in which the user might also have an interest. Recommendation module 270 may use information about characteristics of the user and/or information about the requested digital file as recommendation criteria. Characteristics of the user may include, but are not limited to, age, song preferences, education, prior purchases, surveys, information in the user's record or any other information that may be useful to determine recommendations. Information about the requested digital file may include the title, genre, related songs, related artists or any other information that may be useful to determine recommendations.

In various embodiments, recommendation module 270 runs on the web-based social network database 170 or a different database (not shown). Recommendation module 270 provides the user with a broader selection of digital files. Also, if the requested digital file is not available in a usable format for device 120, recommendation module 270 at least provides the user with a selection of alternative digital files.

Server 140 may include an accounts module 280 to account for the digital file location, source, price and any other information necessary to account and keep track of the transfer of digital files in an accounting and billing system. For example, if a user downloads a ringtone from a publisher, then accounts module 280 collects price, purchase time, delivery time and method of payment. Accounts module 280 may also account for quantity discount information, spending limits or any other information that may be used to account for a transaction between the user and publisher. In alternative embodiments, accounts module 280 is a passive system, only keeping track of how much the user pays a publisher directly, thereby knowing how much commission, if any, may be due.

In various embodiments, the accounts module 280 may work with digital rights management (DRM) technologies. DRM is any of several technologies used by a publisher to restrict usage of and/or access to digital files. Some DRM technologies may include such items as product activation requirements, digital watermarking, Content Scrambling System (CSS) or other scrambling methods. Account module 280 may coordinate with one or more of the device specification module 250, finder module 260 and conversion module 290 to address any requirements of a DRM technology while providing the digital file to a user. For example, a user may be required to accept a copyright or other agreement prior to obtaining the digital file.

In various embodiments, the server 140 may ensure the integrity of the DRM technology. For example, the conversion module 290 may re-encrypt a key when converting from one medium to another.

In some embodiments, server 140 may include the contact privacy settings module 285. The contact privacy settings module 285 stores contact privacy settings for contacts in the web-based social network database 170. The contact privacy settings module 285 allows a user to permit and/or restrict other users' view of information stored in the user's record. For example, a user may designate other users as 'friends' to view all the records of the user and may designate some users as 'co-workers' to have a limited access to a few records. Accordingly, a user may view records of the web-based social network database 170 of other users for which the user has permission to view.

Server 140 may include conversion module 290 to modify a digital file to enable use by device 120. The conversion module 290 may perform display formatting operations similar to those in device specification module 250 or perform formatting operations, such as removing a file header and replacing it with a file header compatible with device 120. For example, the conversion module 290 may change a ringtone used by a Nokia mobile phone to be compatible for use by an LG mobile phone. In another example, the conversion module 290 may change a file from a Tagged Image File Format (TIFF) to a JPEG File Interchange Format (JFIF).

In various embodiments, server 140 includes memory 295 to store and run applications and/or modules. Memory 295 may also contain the records of the web-based social network database 170 and may serve as a repository for digital files. In other embodiments, applications and modules may reside in memory on several servers (not shown).

It will readily be appreciated by one of ordinary skill in the art that the web-based social network database 170 may also function as a standalone application, separate from server 140. Multiple combinations and locations can be configured for the applications and modules discussed herein. For example, each module may reside on a different server. All of these variations remain within the scope of claimed embodiments.

Figure 3:
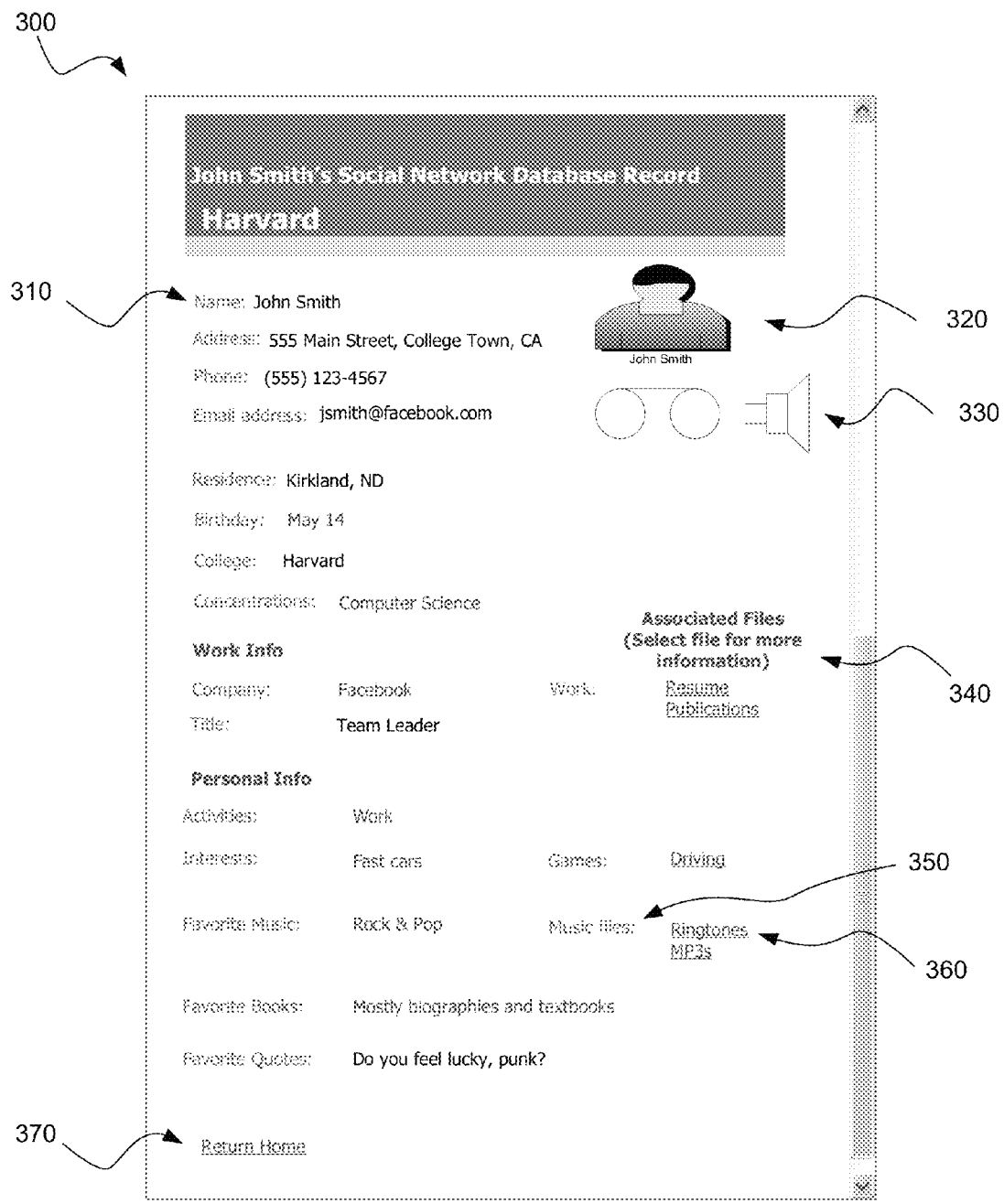
FIG. 3 is an exemplary screenshot of user contact and general information from a record of a web-based social network database.

FIG. 3 is an exemplary screenshot of user contact and general information from a record 300 of the web-based social network database 170. The screenshot illustrates some information shown to a user of the web-based social network database 170. In various embodiments, user contact and general information in the screenshot of the record 300 includes a name field 310, a portrait 320, a link to a recording 330, an associated file listing 340, links to music files 350, music file selections 360 and a navigation link 370. In various embodiments, the user using device 120 may search and/or select information in the record of another user. The information needed to generate the screenshot of the record 300 may reside in memory 230 of device 120 or in some other location, such as memory 295 of server 140.

The name field 310 identifies an owner of the record. The portrait 320 may also help identify the owner. The link to a recording 330 may link to a simple message. Other information may be displayed in one screen on device 120 depending on the device display 210, such as work information, personal information and hobbies.

The associated file listing 340 provides a listing of available digital file information, such as links to music files 350. Music file selections 360 may be selected to display additional information about the selected digital file. Music file selections 360 may include information about ringtones, MP3s or any other music digital file. In some embodiments, navigation link 370 may be provided to help navigate through information in records of the web-based social network database 170.

In various embodiments, the amount of information displayed on device display 210 may vary due to such factors as the size of device display 210 and/or any settings of device specification module 250 to format the displayed information. Other factors that determine the amount of information to present on device display 210 may include settings in device contact application 220 and/or server contact application 240.

Figure 4:
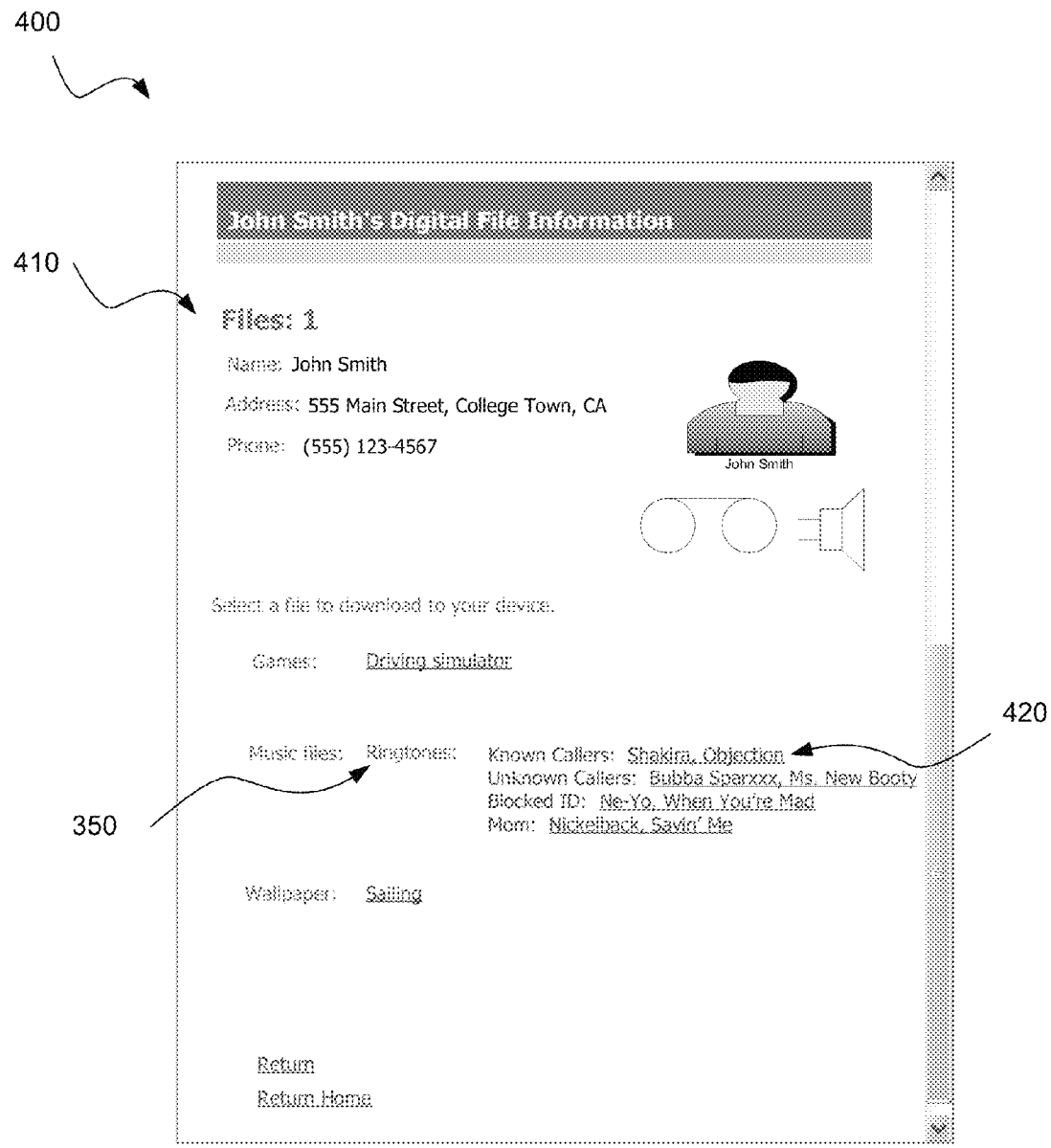
FIG. 4 is an exemplary screenshot of digital file information from a record of a web-based social network database.

FIG. 4 is an exemplary screenshot of digital file information from a record 400 of a web-based social network database 170. In various embodiments, the screenshot of information from record 400 includes record identification information 410 and a digital file link 420. The record identification information 410 helps to identify that the user has navigated to a desired record. Digital file link 420 may be selected if a user would like a copy of the digital file. The selection of digital file link 420 may be performed in various ways and may be device specific. For example, if device 120 is an LG VX8100, then the user may navigate using navigation keys and press an 'OK' button (not depicted) on the device 120 when the user wishes to select digital file link 420. In various embodiments, the display is arranged to permit useful navigation and/or sized for the device display 210.

Figure 5:
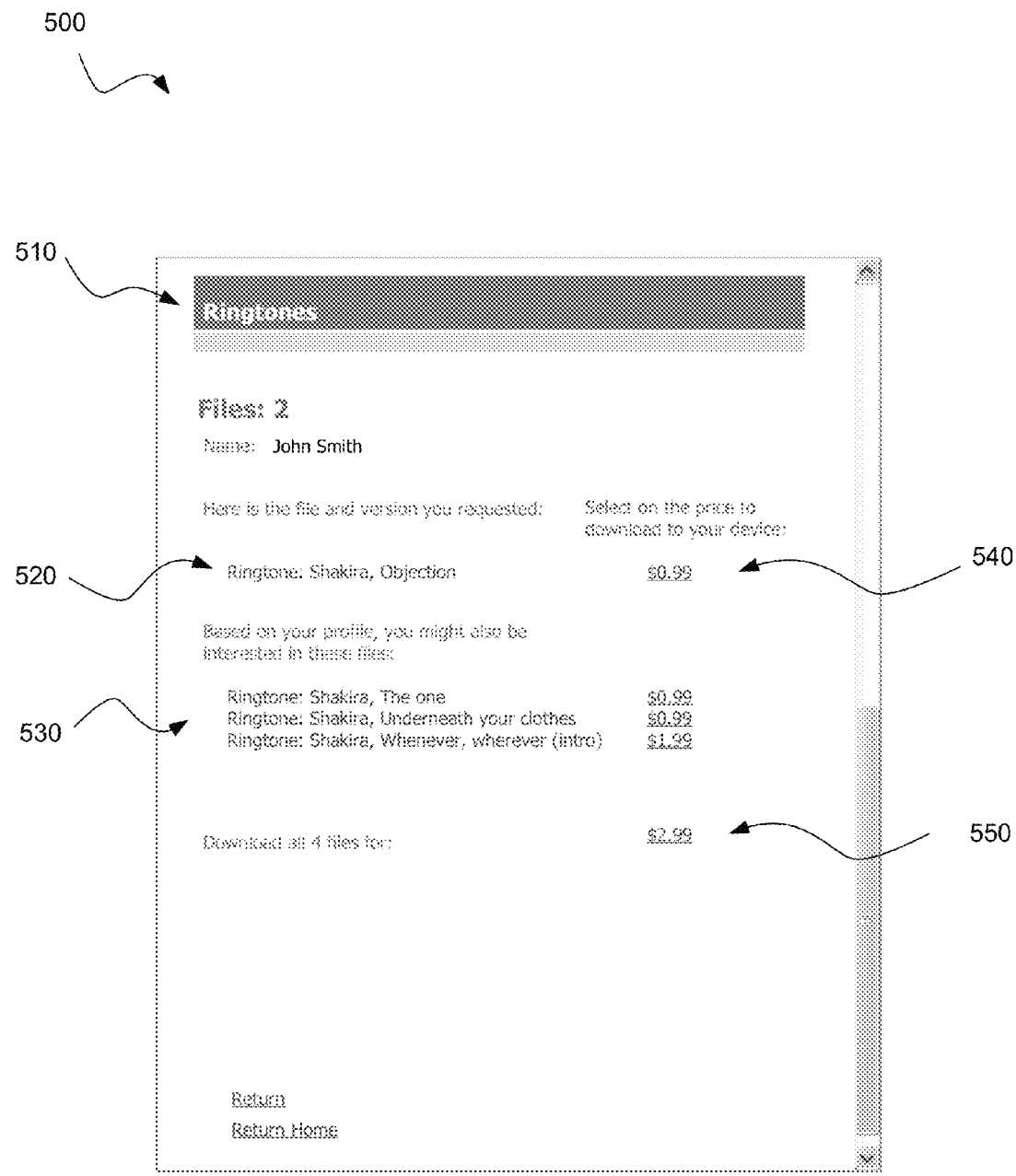
FIG. 5 is an exemplary screenshot of a listing of available digital files.

FIG. 5 is an exemplary screenshot of a listing of available digital files 500. In some embodiments, the listing of available digital files 500 contains a record title 510, digital file information 520, a recommendation listing 530, pricing information 540, and quantity discount pricing 550. The record title 510 may be specific for a type of digital file a user is requesting, e.g., record title 510 is 'Ringtones' when the user selects to download a ringtone.

Digital file information 520 contains the artist, title and other information about the digital file. The user may view the digital file information 520 after selecting digital file link 420. In various embodiments, digital title information 520 contains information that finder module 260 has determined to be the closest match to the user requested digital file. In some embodiments, if finder module 260 cannot locate a title similar to the requested digital file, finder module 260 may either request the conversion module 290 to generate a compatible digital file or return a message to device 120 indicating that the requested digital file is not available at this time. In other embodiments, if finder module 260 finds multiple digital files similar to the requested digital file, then the title of the requested digital file 520 may list information about the similar digital files.

The recommendation listing 530 lists the titles and respective artists of digital files that recommendation module 270 may determine to be of interest to the user. These digital files are selected to be compatible with device 120. In various embodiments, if recommendation module 270 cannot find a predetermined number of usable digital files, e.g., three digital files, then recommendation module 270 may request the conversion module 290 to generate more digital files compatible with device 120.

Optionally, pricing information 540 and any quantity discount pricing 550 is displayed for respective digital files. In some embodiments, if a user desires the digital file at the listed price, the user may select the pricing information 540 to download the digital file. In other embodiments, the pricing information 540 may be a list and the user may select a title to download the digital file. In various embodiments, the user may select multiple digital files prior to downloading.

Figure 6:
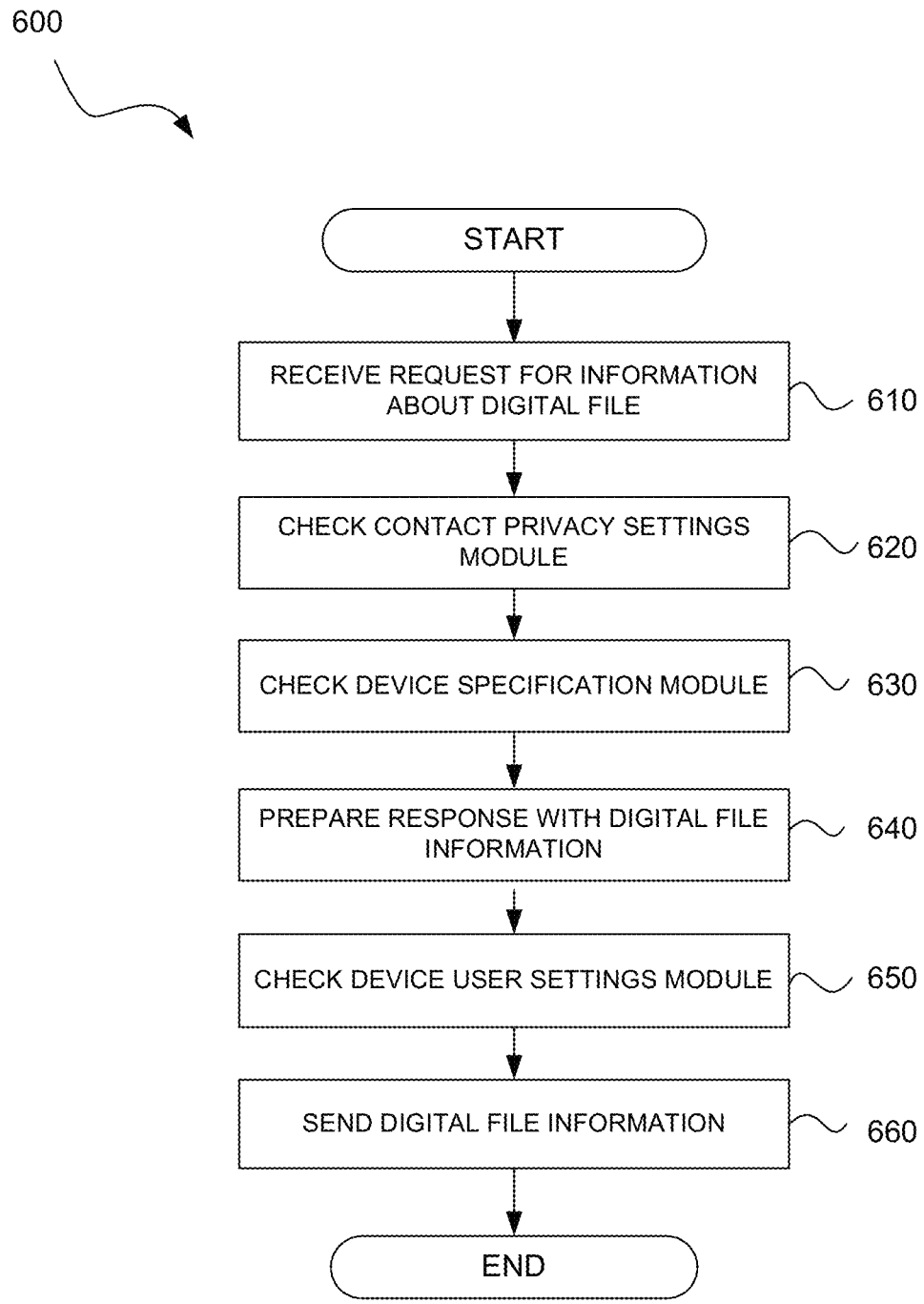
FIG. 6 is a flow chart for an exemplary method for requesting digital file information.

FIG. 6 is a flow chart 600 for an exemplary method for requesting digital file information, according to one embodiment of the present invention. In step 610, the web-based social network database 170 receives a request from a user of the web-based social network database 170 for information about a digital file contained in a record of another user. When requesting digital file information 520, it is not necessary for the user to know specific information about the identity of the digital file. For example, if a user hears the ringtone and does not recognize the artist, the user can still request that ringtone from the record. Knowledge about the existence of the digital file may be obtained by viewing another user's device or by viewing another user's record.

In step 620, the web-based social network database 170 communicates with a privacy module (not shown) located on server 140 to determine if the user requesting digital file information 520 has permission to view the requested information.

In step 630, the web-based social network database 170 and device specification module 250 determine if the user requesting the digital file information 520 has a device capable of using the type of file that the user is requesting. For example, if device 120 does not store ringtones and a user of device 120 requests digital file information 520 about a ringtone, the web-based social network database 170 may relay this incompatibility to the user.

In step 640, the web-based social network database 170 prepares the response with the digital file information 520. In various embodiments, the web-based social network database 170 contains the digital file information 520. In some embodiments, the web-based social network database 170 searches third party databases for digital file information 520.

In step 650, the web-based social network database 170 communicates with a device user settings module (not shown) to determine if any user settings have been specified. For example, if the user of device 120 has specified information to be presented on the top half of device display 210, then the digital file information 520 may be formatted to fit in the top half of device display 210.

In step 660, the web-based social network database 170 sends the digital file information 520 to device 120. In some embodiments, the web-based social network database 170 may send additional information about the file, such as the record identification information 410 and the name field 310. In various embodiments, the web-based social network database 170 may send other digital file listings associated with the record from which the digital file information 520 was requested.

Figure 7:
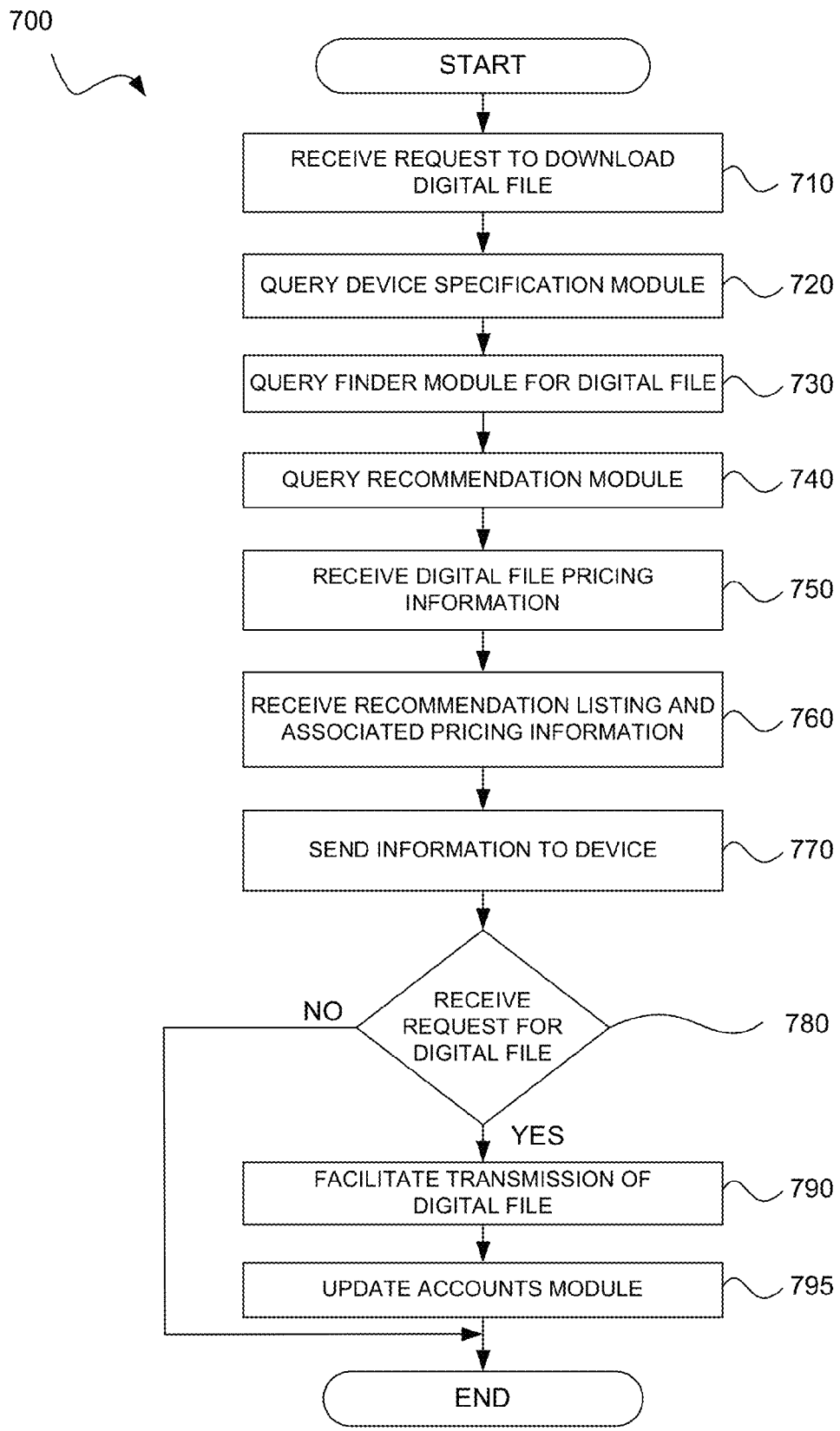
FIG. 7 is a flow chart for an exemplary method for requesting a digital file.

FIG. 7 is a flow chart 700 for an exemplary method for requesting a digital file, according to one embodiment of the present invention. After the user receives digital file information 520, which may be requested as shown in flow chart 600, the user may request to download the digital file.

In step 710, the web-based social network database 170 receives a request from the user to download a digital file. In various embodiments, the web-based social network database 170 determines if the requested digital file is available in a usable format for device 120. The user requesting the digital file may provide information about device 120 to the web-based social network database 170. In other embodiments, the server contact application 240 may determine the device type and/or may reference third party information as to capabilities of device 120.

In step 720, optionally, the web-based social network database 170 queries device specification module 250 to determine types of digital files that are compatible with device 120. In some embodiments, the web-based social network database 170 may query device specification module 250 after some digital files are located to determine if they are compatible with device 120.

In step 730, the web-based social network database 170 queries finder module 260 to locate a digital file similar to the requested digital file. In some embodiments, finder module 260 uses the information from the device specification module 250 in step 720 to find a compatible digital file for device 120. In other embodiments, finder module 260 finds and retrieves any similar digital file and converts the digital file using the conversion module 290 so the digital file will be compatible with device 120.

In step 740, the web-based social network database 170 queries recommendation module 270 to provide the recommendation listing 530. In some embodiments, the web-based social network database 170 may use finder module 260 to locate recommended digital files.

In step 750, the web-based social network database 170 receives digital file pricing information associated with the requested digital file. In various embodiments, the information is provided by finder module 260 and/or third party servers. In some embodiments, the pricing information is located and/or generated in a pricing module (not shown) on server 140.

In step 760, the web-based social network database 170 receives the recommendation listing 530 and associated pricing information. In various embodiments, the information is provided by finder module 260 and/or a third party server.

In step 770, the web-based social network database 170 sends digital file information 520 and associated pricing information to device 120 and, optionally, the recommendation listing 530 and associated pricing information.

In step 780, the user selects a digital file to download, if desired. If the user decides not to select a digital file, the process ends. If the user requests the digital file the process continues to step 790.

In step 790, the web-based social network database 170 facilitates the transmission of the digital file to device 120, to a memory accessible by device 120 or to a third party device. In various embodiments, the user will have the option of where and how the source is to deliver the digital file, e.g., the user may send a ringtone to a friend as a birthday present. In some embodiments, the web-based social network database 170 may allow the user to send a text message informing a third party recipient of a pending digital file download. In various embodiments, the web-based social network database 170 requests a third party to transmit the digital file. In some embodiments, the digital file is sent to a server to be downloaded by device 120 at a later time.

In step 795, the web-based social network database 170 communicates with accounts module 280 regarding any transactions and/or related information. Accounts module 280 may contain information pertaining to accounting, billing, addresses, digital files requested, digital files downloaded or any other information necessary to properly account for Internet transactions, such as state tax information.

While various embodiments have been described above, it should be understood that they have been presented by way of example only, and not limitation. For example, any of the elements associated with requesting and obtaining a digital file from a web-based social database may employ any of the desired functionality set forth hereinabove. The methods shown in FIGS. 6 and 7 are exemplary and some steps may be omitted or added and still fall within the present invention. Thus, the breadth and scope of a preferred embodiment should not be limited by any of the above-described exemplary embodiments.

What is claimed is:

1. A computer-implemented method comprising:
   storing identification information of a digital file associated with a first user of a social networking system;
   receiving a request from a second user of the social networking system for the digital file, the second user connected to the first user by a social networking relationship within the social networking system, the social networking relationship represented by a social map comprising interactions and shared experiences between the second user and the first user;
   responsive to receiving the request from the second user, causing the digital file to be transferred from a third-party source of the digital file to a device of the second user, the third-party source external to the social networking system;
   storing accounting information indicating a price discount for the transfer of the digital file to the second user; and
   determining a price owed by the second user to the third-party source for the transfer of the digital file to the second user, the price determined based at least on the accounting information.

2. The method of claim 1, wherein the stored accounting information further comprises at least one of a purchase time, delivery time, and method of payment associated with the transfer of the digital file.

3. The method of claim 1, further comprising causing an invoice associated with the transfer of the digital file to be sent to the second user.

4. The method of claim 1, wherein the stored accounting information is stored in an account associated with the second user within the social networking system.

5. The method of claim 1, wherein the identification information of the digital file comprises at least one of a location, source, and price of the digital file.

6. The method of claim 1, wherein the digital file is selected from the group consisting of a ringtone, a game, and an image file.

7. The method of claim 1, wherein a source of the digital file is a device of the first user.

8. The method of claim 1, further comprising recommending an additional digital file to the second user based on the request.

9. The method of claim 1, further comprising recommending an additional digital file to the second user based on a purchase history of the second user.

10. The method of claim 1, further comprising
    receiving device information from the device associated with the second user, the device information representing specifications of the device;
    storing the device information; and
    locating a version of the digital file compatible with the device based on the device information.

11. A non-transitory computer-readable storage medium storing instructions for providing a social networking system, the instructions executed by a processor and causing the processor to:
    store identification information of a digital file associated with a first user of a social networking system;
    receive a request from a second user of the social networking system for the digital file, the second user connected to the first user by a social networking relationship within the social networking system, the social networking relationship represented by a social map comprising interactions and shared experiences between the second user and the first user;
    responsive to receiving the request from the second user, cause the first digital file to be transferred from a third-party source of the digital file to a device of the second user, the third-party source external to the social networking system;
    store accounting information indicating a price discount for the transfer of the digital file to the second user; and
    determine a price owed by the second user to the third-party source for the transfer of the digital file to the second user, the price determined based at least on the accounting information.

12. The computer-readable storage medium of claim 11, wherein the stored accounting information further comprises at least one of a purchase time, delivery time, and method of payment associated with the transfer of the digital file.

13. The computer-readable storage medium of claim 11, the instructions executed by a processor and further causing the processor to cause an invoice associated with the transfer of the digital file to be sent to the second user.

14. The computer-readable storage medium of claim 11, wherein the stored accounting information is stored in an account associated with the second user within the social networking system.

15. The computer-readable storage medium of claim 11, wherein the identification information of the digital file comprises at least one of a location, source, and price of the digital file.

16. The computer-readable storage medium of claim 11, wherein the digital file is selected from the group consisting of a ringtone, a game, and an image file.

17. The computer-readable storage medium of claim 11, the instructions executed by a processor and further causing the processor to recommend an additional digital file to the second user based on a purchase history of the second user.

18. The computer-readable storage medium of claim 11, the instructions executed by a processor and further causing the processor to:
   receive device information from the device associated with the second user, the device information representing specifications of the device;
   store the device information; and
   locate a version of the digital file compatible with the device based on the device information.

19. A computer system comprising:
   a processor; and
   a memory coupled to the processor and storing instructions executable by the processor to:
      store identification information of a digital file associated with a first user of a social networking system;
      receive a request from a second user of the social networking system for the digital file, the second user connected to the first user by a social networking relationship within the social networking system, the social networking relationship represented by a social map comprising interactions and shared experiences between the second user and the first user;
      responsive to receiving the request from the second user, cause the first digital file to be transferred from a third-party source of the digital file to a device of the second user, the third-party source external to the social networking system;
      store accounting information indicating a price discount for the transfer of the digital file to the second user; and
      determine a price owed by the second user to the third-party source for the transfer of the digital file to the second user, the price determined based at least on the accounting information.

* * * * *